United States Patent
Miller et al.

(10) Patent No.: US 10,246,073 B2
(45) Date of Patent: Apr. 2, 2019

(54) CONTROL SYSTEM FOR A HYBRID-ELECTRIC VEHICLE

(71) Applicant: Ford Global Technologies, LLC, Dearborn, MI (US)

(72) Inventors: Kenneth James Miller, Canton, MI (US); Thomas G. Leone, Ypsilanti, MI (US); Christopher Alan Lear, Dearborn, MI (US); Chris James Hocking, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 193 days.

(21) Appl. No.: 15/181,491

(22) Filed: Jun. 14, 2016

(65) Prior Publication Data

US 2017/0327104 A1     Nov. 16, 2017

Related U.S. Application Data

(63) Continuation-in-part of application No. 15/155,502, filed on May 16, 2016, and a continuation-in-part of application No. 15/155,552, filed on May 16, 2016.

(51) Int. Cl.
*B60W 10/06* (2006.01)
*B60W 10/08* (2006.01)
(Continued)

(52) U.S. Cl.
CPC ............ *B60W 10/06* (2013.01); *B60W 10/08* (2013.01); *B60W 20/15* (2016.01); *B60W 30/20* (2013.01);
(Continued)

(58) Field of Classification Search
CPC .... B60W 20/17; B60W 10/11; B60W 10/184; B60W 10/06; B60W 20/14;
(Continued)

(56) References Cited

U.S. PATENT DOCUMENTS 6,436,005 B1* 8/2002 Bellinger .............. B60W 10/06
                                                        477/110
6,786,191 B2   9/2004 Foster
(Continued)

FOREIGN PATENT DOCUMENTS

CN    102337974 A    2/2012
CN    205370771 U    7/2016

OTHER PUBLICATIONS

UKIPO Search Report dated Aug. 24, 2017 for Application No. GB1707219.0 (5 pages).
(Continued)

*Primary Examiner* — Joseph Dallo
(74) *Attorney, Agent, or Firm* — David B. Kelley; Bejin Bieneman PLC (57) ABSTRACT

A hybrid-electric vehicle includes a power system, a controller, a driver seat, a passenger seat, a back seat, and sensors. The controller is in communication with the sensors and the power system. The seats are coupled, directly or indirectly, to the power system. The sensors are configured to detect occupancy of the driver, passenger, and back seats. The controller is programmed to receive occupancy data from the sensors, determine an occupancy status based on the occupancy data, set an operating parameter for the power system based on the occupancy status, and control the power system in accordance with the parameter.

20 Claims, 4 Drawing Sheets

(51) Int. Cl.
  *B60W 30/20* (2006.01)
  *B60W 20/15* (2016.01)
  *B60K 6/20* (2007.10)
  *B60W 50/00* (2006.01)

(52) U.S. Cl.
  CPC ........ *B60K 6/20* (2013.01); *B60W 2050/0075* (2013.01); *B60W 2540/00* (2013.01); *B60Y 2200/92* (2013.01); *B60Y 2300/188* (2013.01); *B60Y 2300/20* (2013.01); *F02N 2200/106* (2013.01); *Y02T 10/6286* (2013.01); *Y10S 903/93* (2013.01); *Y10S 903/951* (2013.01)

(58) Field of Classification Search
  CPC ......... B60W 2400/00; B60W 2710/18; B60W 2710/1005; B60K 6/40; B60K 6/42; B60Y 2300/20; B60Y 2200/92; Y10S 903/951; Y10S 903/93
  See application file for complete search history.

(56) References Cited

U.S. PATENT DOCUMENTS

| | | | |
|---|---|---|---|
| 6,874,383 B2 | 4/2005 | Sayman et al. | |
| 7,278,391 B1 | 10/2007 | Wong et al. | |
| 7,499,784 B2 | 3/2009 | Kresse | |
| 7,637,842 B2 | 12/2009 | Tamai et al. | |
| 7,696,710 B2 | 4/2010 | Byrne et al. | |
| 7,836,866 B2 | 11/2010 | Luken et al. | |
| 8,050,856 B2 | 11/2011 | Duty et al. | |
| 8,108,132 B2 | 1/2012 | Reinke | |
| 8,660,734 B2 | 2/2014 | Zhu et al. | |
| 8,755,959 B2 * | 6/2014 | Fassnacht | B60W 10/06 701/22 |
| 8,882,636 B2 | 11/2014 | Pietron et al. | |
| 8,948,955 B2 | 2/2015 | Zhu et al. | |
| 9,008,854 B2 | 4/2015 | Breed | |
| 9,082,239 B2 | 7/2015 | Ricci | |
| 9,086,020 B2 | 7/2015 | Pirjaberi et al. | |
| 9,475,361 B2 | 10/2016 | Arai et al. | |
| 2004/0068998 A1 | 4/2004 | Ieda et al. | |
| 2004/0079099 A1 | 4/2004 | Kumada et al. | |
| 2005/0045322 A1 | 3/2005 | Yoshida et al. | |
| 2005/0052080 A1 | 3/2005 | Maslov et al. | |
| 2005/0121185 A1 | 6/2005 | Yonekura et al. | |
| 2006/0000597 A1 | 1/2006 | Errington et al. | |
| 2007/0038364 A1 | 2/2007 | Lee et al. | |
| 2007/0112502 A1 * | 5/2007 | Asano | F02D 41/1498 701/111 |
| 2007/0209789 A1 | 9/2007 | Domura et al. | |
| 2007/0235549 A1 | 10/2007 | Nakajima | |
| 2007/0277544 A1 | 12/2007 | Honda et al. | |
| 2008/0196954 A1 * | 8/2008 | Soliman | B60K 6/48 180/65.25 |
| 2009/0030568 A1 | 1/2009 | Amano et al. | |
| 2009/0031741 A1 | 2/2009 | Hara et al. | |
| 2009/0139789 A1 * | 6/2009 | Yang | B60W 20/00 180/243 |
| 2010/0132388 A1 | 6/2010 | Oyobe et al. | |
| 2010/0163220 A1 | 7/2010 | Nakajima | |
| 2011/0112708 A1 * | 5/2011 | Fassnacht | B60W 10/06 701/22 |
| 2011/0172880 A1 | 7/2011 | Tamura | |
| 2011/0208403 A1 * | 8/2011 | Tsumiyama | F02D 41/021 701/102 |
| 2011/0246021 A1 * | 10/2011 | Prokhorov | B60T 7/122 701/36 |
| 2012/0074238 A1 | 3/2012 | Morita et al. | |
| 2012/0109438 A1 * | 5/2012 | Akebono | B60K 6/48 701/22 |
| 2013/0079978 A1 | 3/2013 | Uyeki | |
| 2013/0092127 A1 * | 4/2013 | Pirjaberi | F02D 41/0087 123/406.23 |
| 2014/0053804 A1 * | 2/2014 | Rayl | F02D 41/0087 123/350 |
| 2014/0090624 A1 * | 4/2014 | Verner | F02D 41/0087 123/406.12 |
| 2014/0244106 A1 * | 8/2014 | Singer | G06F 17/00 701/36 |
| 2015/0129192 A1 | 5/2015 | Boss et al. | |
| 2015/0203106 A1 * | 7/2015 | Zhao | B60L 7/18 701/22 |
| 2015/0260117 A1 | 9/2015 | Shost et al. | |
| 2015/0338858 A1 | 11/2015 | Bates et al. | |
| 2015/0345958 A1 | 12/2015 | Graham | |
| 2016/0059845 A1 * | 3/2016 | Nefcy | B60W 20/30 477/115 |
| 2016/0144689 A1 | 5/2016 | Miller et al. | |
| 2016/0193895 A1 | 7/2016 | Aich et al. | |
| 2016/0207375 A1 | 7/2016 | Gauthier et al. | |
| 2016/0214596 A1 * | 7/2016 | Glugla | B60W 10/00 |
| 2016/0280160 A1 | 9/2016 | MacNeille et al. | |
| 2016/0328976 A1 * | 11/2016 | Jo | F02D 41/403 |
| 2016/0339906 A1 * | 11/2016 | Nefcy | B60K 6/547 |
| 2016/0347149 A1 | 12/2016 | Rustoni | |

OTHER PUBLICATIONS

Non-Final Office Action dated Jun. 19, 2017 for U.S. Appl. No. 15/155,552 (4 pages).

Wilcutts et al., "Design and Benefits of Dynamic Skip Fire Strategies for Cylinder Deactivated Engines", Sae Int. J. Engines 6(1):2013, doi: 10.4271/2013-01-0359; published Apr. 8, 2013 (11 pages).

Non-Final Office Action dated Dec. 11, 2018 for U.S. Appl. No. 15/214,496 (28 pages).

* cited by examiner

CONTROL SYSTEM FOR A HYBRID-ELECTRIC VEHICLE

CROSS-REFERENCE TO RELATED APPLICATIONS

This patent application is a continuation-in-part of and claims priority to and all advantages of U.S. patent application Ser. Nos. 15/155,502 and 15/155,552, respectively entitled "Powertrain Control System" and "Cylinder Deactivation Control System," each filed on May 16, 2016, and each respectively incorporated herein by reference in their entireties.

BACKGROUND

A powertrain of a hybrid-electric vehicle includes an internal-combustion engine, an electric motor, a battery pack, and a transmission. The battery pack is connected to the electric motor. The electric motor is coupled to the transmission and transmits rotational kinetic energy to the transmission, and the internal-combustion engine may be coupled to either the electric motor or to the transmission. The transmission transmits the kinetic energy from the electric motor and/or the internal-combustion engine to a drive axle and ultimately to wheels of the vehicle, while applying a gear ratio allowing different tradeoffs between torque and rotational speed.

A hybrid-electric vehicle may include regenerative braking. A regenerative-braking system may include regenerative brakes and friction brakes. The regenerative-braking system applies a ratio of regenerative to friction braking that can vary.

Noise, vibration, and harshness (NVH) constraints can limit the fuel economy possible for the powertrain. More frequently starting and stopping the internal-combustion engine can increase the efficiency of the hybrid-electric powertrain, but the starts and stops may be unpleasant or distracting to occupants. Likewise, reducing the hysteresis between upshifting to and downshifting from a gear can increase the efficiency of the transmission, but more frequent shifting may annoy or distract occupants. Shifting gears based on a state of charge of the battery pack even though desired acceleration is steady can also increase the efficiency of the transmission, but this again leads to more frequent shifting. Increasing the ratio of regenerative to friction braking, for example, by ramping more quickly from regenerative braking to friction braking, can also increase the energy recouped by the regenerative-braking system, but this may produce an uneven braking feel for occupants.

DETAILED DESCRIPTION

With reference to the Figures, wherein like numerals indicate like parts throughout, a hybrid-electric vehicle 30 includes a power system, a controller 32, a driver seat 34, a passenger seat 36, a back seat 38, and sensors 40. The power system may be or include, for example, an internal-combustion engine 44, an electric motor 54, a transmission 46, and/or a regenerative-braking system 48. The controller 32 is communicatively coupled, e.g., in a known manner, to the sensors 40 and the power system. The seats 34, 36, 38 are coupled, directly or indirectly, to the power system. The sensors 40 are configured to detect occupancy of the driver, passenger, and back seats 34, 36, 38. The controller 32 is programmed to receive occupancy data from the sensors 40, determine an occupancy status based on the occupancy data, set an operating parameter for the power system based on the occupancy status, and control the power system in accordance with the parameter.

Setting the operating parameter for the power system increases the efficiency of the vehicle 30 at the expense of increasing noise, vibration, and/or harshness (NVH) in situations in which the increased NVH is less likely to be experienced by occupants. If the vehicle 30 is autonomous (e.g., according to the definition of that term below), then the vehicle 30 may be unoccupied, or occupants may be seated only in the back seat 38 and not the driver or passenger seats 34, 36, or an occupant may be seated in the passenger seat 36 and not the driver seat 34. Occupants of the back seat 38 may be less exposed to NVH from the power systems, e.g., the internal-combustion engine 44, the electric motor 54, the transmission 46, and/or the regenerative-braking system 48, than occupants of the driver or passenger seats 34, 36, and the occupants of the driver seat 34 and the passenger seat 36 may have different NVH exposures. Increased NVH has less downside in some of these occupancy statuses than others, so it becomes more acceptable to trade off NVH for greater efficiency of the vehicle 30.

The vehicle 30 may be an autonomous vehicle. In this context, "autonomous" means that each of vehicle propulsion (e.g., a hybrid-electric powertrain 42), steering, and braking are controlled by the controller 32 without human intervention. The controller 32, sometimes referred to as the "virtual driver," may be capable of operating the vehicle 30 independently of the intervention of a human driver, to a greater or a lesser degree, e.g., the vehicle 30 could be operated semi-autonomously, meaning that one or two of propulsion, steering, and braking are controlled by the controller 32 without human intervention. The controller 32 may be programmed to operate the internal-combustion engine 44, the electric motor 54, the transmission 46, the regenerative-braking system 48, a steering system, and/or other vehicle systems. The controller 32 may have an autonomous mode, in which the controller 32 operates the vehicle 30, and semi-autonomous and/or manual modes, in which a human driver operates some or all of the subsystems of the vehicle 30 pertaining to propulsion, steering, and braking.

Figure 1:
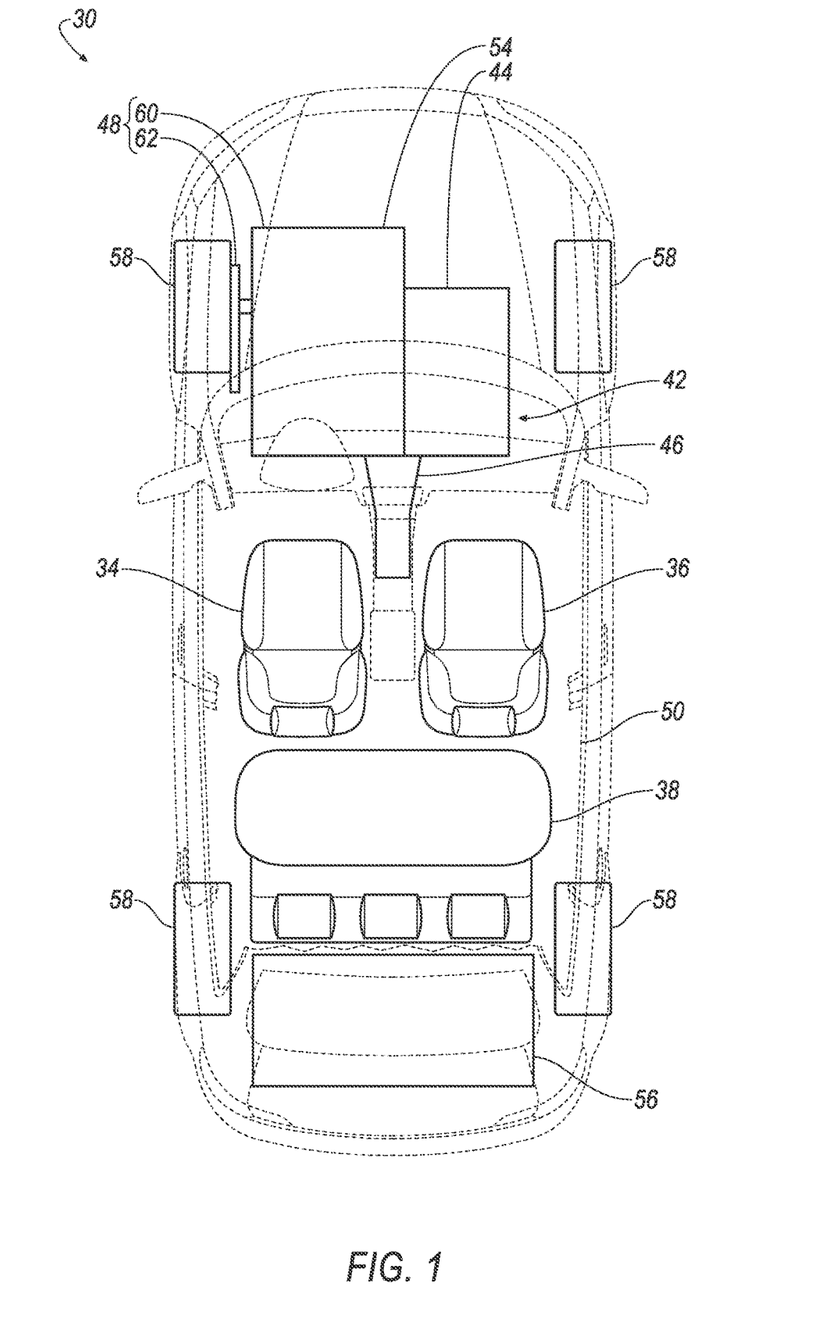
FIG. 1 is a top view of an example vehicle.

As shown in FIG. 1, the vehicle 30 includes a passenger cabin 50 to house occupants, if any, of the vehicle 30. The passenger cabin 50 includes the driver seat 34 and the passenger seat 36 disposed at a front of the passenger cabin 50, and one or more back seats 38 disposed behind the driver and passenger seats 34, 36. The passenger cabin 50 may also include third-row seats (not shown) at a rear of the passenger cabin 50. In FIG. 1, the driver and passenger seats 34, 36 are shown to be bucket seats and the back seat 38 is a bench seat, but the seats 34, 36, 38 may be other types. The seats 34, 36, 38 may be coupled to one of the power systems, that is, directly or indirectly mechanically connected to one of the power systems; specifically, the seats 34, 36, 38 may be coupled to a frame of the vehicle 30 (not shown), and one of the power systems may be coupled to the frame. The position and orientation of the seats 34, 36, 38 and components thereof may be adjustable by an occupant.

The vehicle 30 includes the hybrid-electric powertrain 42, which includes the internal-combustion engine 44, the electric motor 54, and the transmission 46. The transmission 46 is directly or indirectly drivably connected to the internal-combustion engine 44, e.g., in a known manner. The powertrain 42, as is known, produces energy and converts the energy into rotational motion of wheels 58 that propel the vehicle 30. The hybrid-electric powertrain 42 may be, for example, a parallel hybrid powertrain, in which both the internal-combustion engine 44 and the electric motor 54 are connected to the transmission 46; a series hybrid powertrain, in which the internal-combustion engine 44 is connected to and operates as a generator for the electric motor 54, which is connected to the transmission 46; a power-split (also called series-parallel) hybrid powertrain, which is a combination of parallel and series powertrains; or any other type of hybrid-electric powertrain.

A battery pack 56 is connected to the electric motor 54. The battery pack 56 has a state of charge, which is the energy remaining in the battery pack 56 relative to the energy capacity of the battery pack 56. The battery pack 56 is rechargeable. The battery pack 56 may include several individual batteries. The batteries may be lead-acid, nickel-cadmium, nickel metal hydride, lithium-ion, lithium-ion polymer, zinc-air, molten salt, or any other suitable type of battery.

An engine-pull-up-down schedule, or EPUD schedule, specifies conditions for running the internal-combustion engine 44 as opposed to relying on power from the battery pack 56. The EPUD schedule is a function of at least the state of charge of the battery pack 56, and requested acceleration, indicated by a position of an accelerator pedal or a throttle (not shown). The conditions in a particular EPUD schedule to start the internal-combustion engine 44 may differ from the conditions to stop the internal-combustion engine 44 in that EPUD schedule; in other words, the EPUD schedule may include hysteresis between starting and stopping the internal-combustion engine 44. For example, the minimum requested acceleration to start the internal-combustion engine 44 may be higher than a maximum requested acceleration to stop the internal-combustion engine 44. For another example, the requested acceleration may need to remain below a maximum requested acceleration for a predetermined period of time to stop the internal-combustion engine 44.

The transmission 46 is coupled to the internal-combustion engine 44 and the electric motor 54, that is, directly or indirectly drivably connected to the internal-combustion engine 44 and the electric motor 54. The transmission 46 transmits power from the internal-combustion engine 44 and/or the electric motor 54 to a drive axle connected to the wheels 58. The transmission 46 can change the gear ratio between input from the hybrid-electric engine 44 and output to the drive axle. The transmission 46 may be any suitable type of transmission, including an automatic transmission with a set of defined gear ratios, called gears, or a continuously variable transmission. At higher gear ratios or lower gears, the transmission 46 transmits more torque at a higher engine speed to the drive axle, and at lower gear ratios or higher gears, the transmission 46 receives torque from the internal-combustion engine 44 and/or the electric motor 54 at a slower engine speed for a given speed of the drive axle and transmits less torque to the drive axle.

Figure 2:
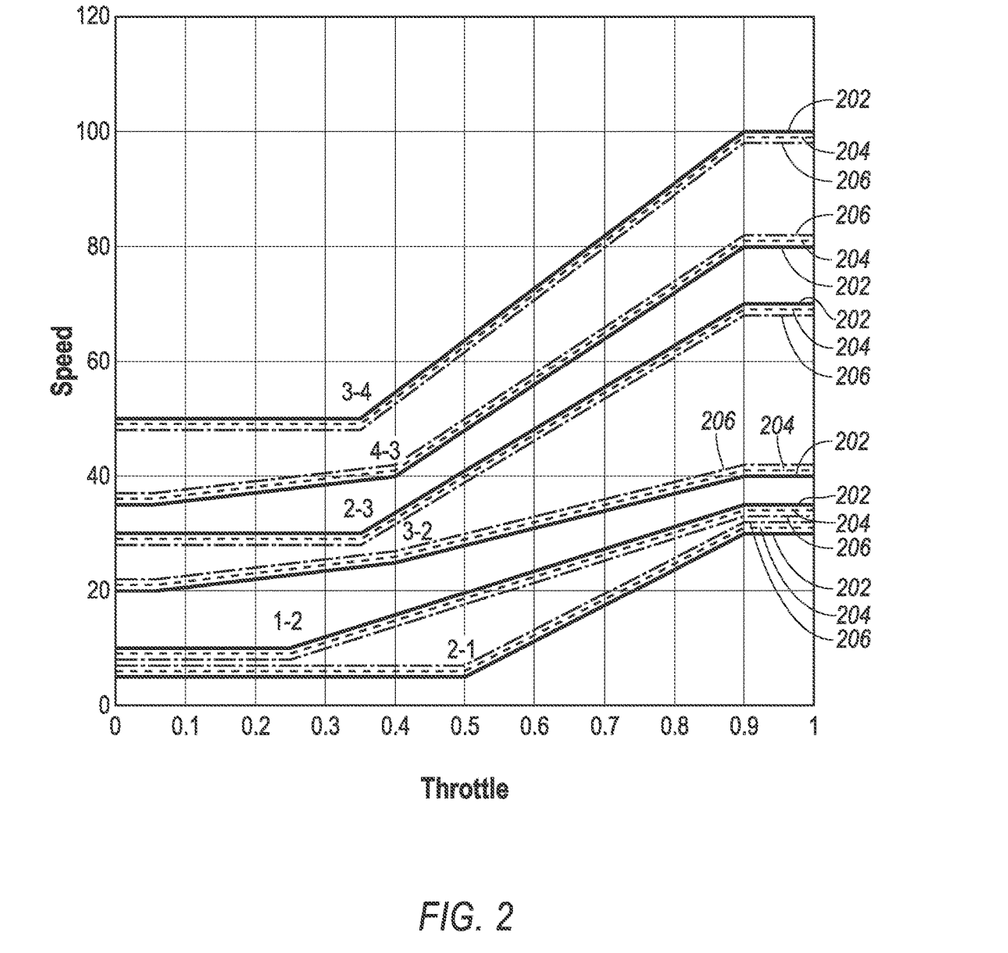
FIG. 2 is a graph of example transmission schedules.

A transmission schedule determines the gear ratio of the transmission 46 as a function of the vehicle speed and the position of an accelerator pedal or a throttle (not shown). For an automatic transmission, a transmission schedule indicates the conditions under which the transmission 46 will shift between two gears as a function of the vehicle speed and the pedal or throttle position. The throttle is an input device, such as a floor pedal, through which an occupant indicates a desired change in the vehicle acceleration or speed. FIG. 2 shows an example transmission schedule 202 for an automatic transmission in solid lines. The solid lines indicate the values of vehicle speed and throttle position at which the transmission 46 will shift between one gear and another gear; the line marked "2-1" shows the shift from second gear to first gear, "1-2" from first to second, "3-2" from third to second, and so on.

The regenerative-braking system 48 includes regenerative brakes 60 and friction brakes 62. The regenerative brakes 60 and friction brakes 62 are independently applied, and requested braking force may be allocated in any ratio from entirely regenerative braking, i.e., 1:0, to entirely friction braking, i.e., 0:1.

The regenerative brakes 60 transform the kinetic energy of the vehicle 30 into energy stored in the battery pack 56. The regenerative brakes 60 are an electric motor that may be the same electric motor 54 in the hybrid-electric powertrain 42, or an additional electric motor coupled to the wheels 58. The regenerative brakes 60 operate as generators, into which the forward rotational motion of the wheels 58 provides an input. By reversing the direction of the torque on, for example, the electric motor 54 to resist the motion of the wheels 58, the electric motor 54 functions as an electrical generator instead of as a motor, and the electric motor 54 absorbs the kinetic energy of the vehicle 30 through the torque and motion of the wheels 58.

The friction brakes 62 provide stopping power through friction between a component rotating with the wheel 58 and a component stationary relative to the vehicle 30. The friction brakes 62 may be disc brakes, drum brakes, band brakes, or any other suitable type of brake.

A regenerative-braking schedule determines a ratio of regenerative braking to friction braking that the regenerative-braking system 48 applies. The regenerative-braking schedule is a function of a desired braking force, the state of charge of the hybrid-electric powertrain 42, the current ratio and recent history of regenerative and friction braking being applied, and possibly other external or vehicle conditions. The desired braking force may be indicated by a human driver through a brake pedal (not shown) or determined by the controller 32 or a virtual driver if the vehicle 30 is operating autonomously. If the state of charge is full or nearly full, for example, then regenerative braking may be reduced in favor of friction braking. The regenerative-braking schedule may take the recent braking history and current ratio of regenerative to friction braking into account by ramping between ratios of regenerative to friction braking rather than discontinuously jumping from one ratio to another.

The power systems are the systems of the vehicle 30 that generates power or transforms power into motion of the vehicle 30. The internal-combustion engine 44, the electric motor 54, the transmission 46, the hybrid-electric powertrain 42 as a whole, and the regenerative-braking system 48 are all power systems.

Figure 3:
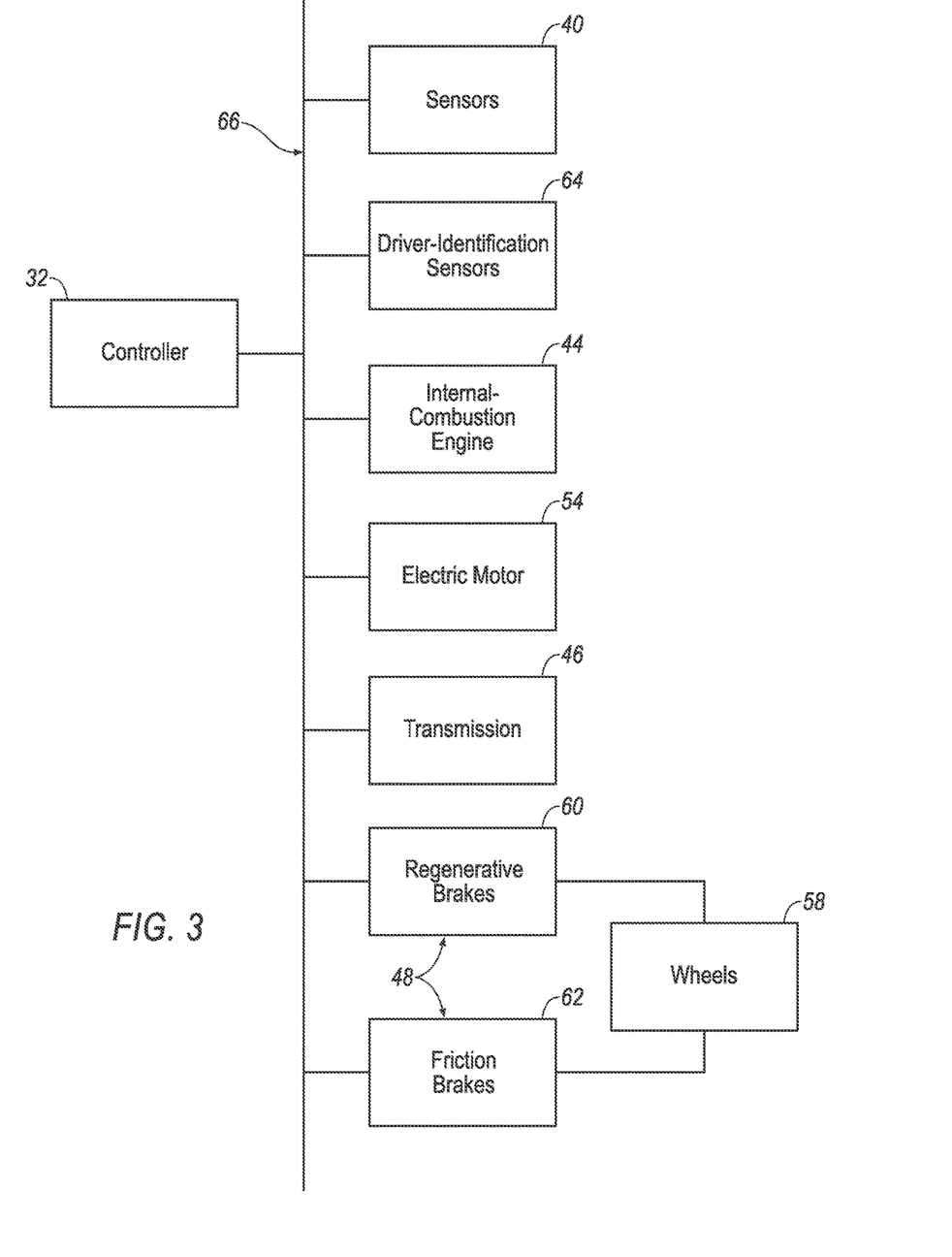
FIG. 3 is a block diagram of an example control system.

As shown in FIG. 3, the vehicle 30 includes sensors 40 configured to detect occupancy of the driver seat 34, the passenger seat 36, and the back seat 38. The sensors 40 may be visible-light or infrared cameras directed at the seats 34, 36, 38, weight sensors inside the seats 34, 36, 38, sensors detecting whether a seat belt (not shown) is buckled or unspooled, or other suitable sensors. The sensors 40 are in communication with the controller 32 via a communications network 66. If the vehicle 30 is in manual mode, the controller 32 detects that the driver seat 34 is necessarily occupied.

A driver-identification sensor 64 may be in communication with the controller 32. The driver-identification sensor 64 may detect an RFID or other signature unique to different keys of the vehicle 30, an input by an occupant of the vehicle 30, biometric data of an occupant of the vehicle 30, or any other suitable indicator of identity for an occupant of the vehicle 30. The identity of an occupant of the vehicle 30 may be associated with a classification of that occupant, for example, as a chauffeur or as a nonchauffeur.

As further shown in FIG. 3, the controller 32 is communicatively coupled to the internal-combustion engine 44, the electric motor 54, the transmission 46, and the regenerative-braking system 48. The controller 32 may be a microprocessor-based controller. The controller 32 may include a processor, memory, etc. The memory of the controller 32 typically stores instructions executable by the processor.

The controller 32 may transmit and receive signals through the communications network 66, such as a controller area network (CAN) bus, Ethernet, Local Interconnect Network (LIN), and/or by any other wired or wireless communications network, e.g., as is known.

Figure 4:
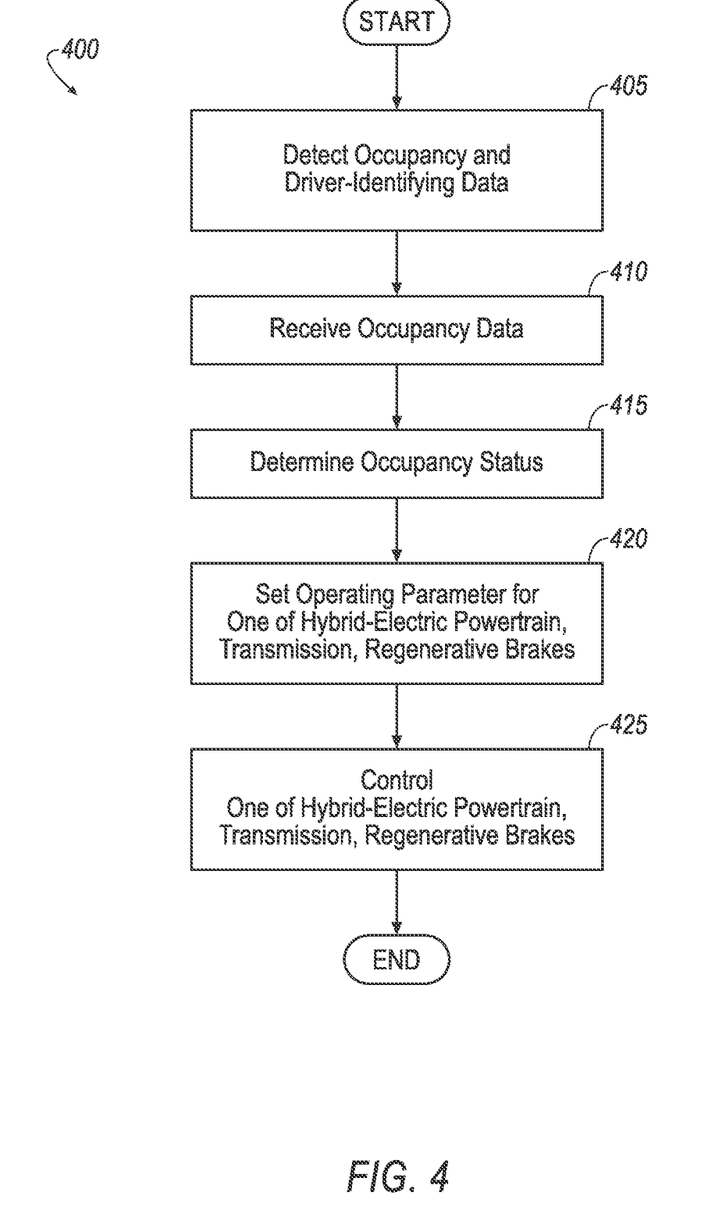
FIG. 4 is a process flow diagram of an exemplary process for adjusting the efficiency and noise, vibration, and harshness characteristics of the vehicle of FIG. 1.

FIG. 4 is a process flow diagram illustrating an exemplary process 400 for adjusting the NVH and efficiency characteristics of the vehicle 30 based on an occupancy status of the vehicle 30. The process begins in a block 405, in which the sensors 40 detect occupancy data and the driver-identification sensor 64 detects driver-identifying data. For example, if the sensors 40 are weight sensors, the sensors 40 may detect weight in the back seat 38 but not in the driver and passenger seats 34, 36.

Next, in a block 410, the controller 32 receives occupancy data from the sensors 40 and receives driver-identifying data from the driver-identification sensor 64 via the communications network 66.

Next, in a block 415, the controller 32 determines an occupancy status of the vehicle 30 based on received sensor data, including the occupancy data and the driver-identifying data. The controller 32 thus detects the occupancy status of the vehicle 30. The occupancy status may be determined to be one of multiple possible statuses stored in the controller 32 memory. The memory may store as few as two possible occupancy statuses, up to a number of statuses to accommodate a unique occupancy status for each possible seating configuration. For example, if the vehicle 30 is an SUV or minivan with eight seats, there may be as many as $2^8=256$ occupancy statuses without using driver-identifying data.

For example, the occupancy status may be one of "occupied" and "unoccupied." The occupancy status is occupied if the occupancy data indicates that at least one of the seats 34, 36, 38 is occupied. The occupancy status is unoccupied if the occupancy data indicates that all the seats 34, 36, 38 are unoccupied.

For another example, the occupancy status may be one of "front-seat-occupied," "back-seat-only-occupied," and "unoccupied." The occupancy status is front-seat-occupied if the occupancy data indicates that at least one of the driver seat 34 and the passenger seat 36 is occupied. The occupancy status is back-seat-only-occupied if the occupancy data indicates that both the driver seat 34 and the passenger seat 36 are unoccupied and the back seat 38 is occupied. The occupancy status is unoccupied if the occupancy data indicates that the seats 34, 36, 38 are unoccupied.

For a third example, the occupancy status may be one of "driver-seat-occupied," "passenger-seat-only-occupied," "back-seat-only-occupied," and "unoccupied." The occupancy status is driver-seat-occupied if the occupancy data indicates that the driver seat 34 is occupied. The occupancy status is passenger-seat-only-occupied if the occupancy data indicates that the passenger seat 36 is occupied and the driver seat 34 is unoccupied. The occupancy status is back-seat-only-occupied if the occupancy data indicates that the driver and passenger seats 34, 36 are unoccupied and the back seat 38 is occupied. The occupancy status is unoccupied if the occupancy data indicates that the driver, passenger, and back seats 34, 36, 38 are unoccupied.

For a fourth example, the occupancy status may be one of "front-seat-occupied," "chauffeur," "back-seat-only-occupied," and "unoccupied." The occupancy status is front-seat-occupied if the occupancy data indicates that the driver seat 34 or the passenger seat 36 is occupied and the driver-identifying data indicates that an occupant of the driver or passenger seat 34, 36 is a nonchauffeur. The occupancy status is chauffeur if the occupancy data indicates that the driver seat 34 is occupied, the passenger seat 36 is unoccupied, and the driver-identifying data indicates that an occupant of the driver seat 34 is a chauffeur. The occupancy status is back-seat-only-occupied if the occupancy data indicates that the driver and passenger seats 34, 36 are unoccupied and the back seat 38 is occupied. The occupancy status is unoccupied if the occupancy data indicates that the seats 34, 36, 38 are unoccupied. The chauffeur and back-seat-only-occupied statuses may be treated as the same occupancy status or as different statuses.

In addition to these three examples, other occupancy statuses and/or combinations of occupancy statuses are possible.

Next, in a block 420, the controller 32 sets an operating parameter for a power system of the hybrid-electric vehicle 30 based on the occupancy status. An operating parameter is a set of instructions that may change depending on a mode. The mode-dependent changes may include adding or removing instructions, increasing or decreasing a value at which an instruction is carried out, and so on. Setting the operating parameter is selecting the mode for the operating parameter, and thus determining how the power system will operate. The operating parameter may be a parameter of one of the hybrid-electric powertrain 42, transmission 46, and regenerative-braking system 48.

For example, the parameter may be the engine-pull-up-down (EPUD) schedule, and the power system may be the hybrid-electric powertrain 42. The controller 32 may store a different EPUD schedule for each possible occupancy status. The powertrain 42 operates with less hysteresis for occupancy statuses with less stringent NVH requirements. For example, an EPUD schedule for the unoccupied status may have less hysteresis between starting and stopping the internal-combustion engine 44 than an EPUD schedule for the back-seat-only-occupied status, and the EPUD schedule for the back-seat-only-occupied status may have less hysteresis between starting and stopping the internal-combustion engine 44 than an EPUD schedule for the driver-seat-occupied status.

For another example, the operating parameter may be a regenerative-braking schedule, and the power system may be the regenerative-braking system 48 including the regenerative brakes 60 and the friction brakes 62. The controller 32 may store a different regenerative-braking schedule for each possible occupancy status. The regenerative-braking system 48 uses greater ratios of regenerative braking to friction braking for occupancy statuses with less stringent NVH requirements. For example, a regenerative-braking schedule for the unoccupied status may have a ratio of regenerative braking to friction braking that is no less than, and under at least some vehicle conditions greater than, a regenerative-braking schedule for the back-seat-only-occupied status; and the regenerative-braking schedule for the back-seat-only-occupied status may have a ratio of regenerative braking to friction braking that is no less than, and under at least some vehicle conditions greater than, a regenerative-braking schedule for the driver-seat-occupied status. The regenerative-braking system 48 may use greater ratios of total regenerative energy to friction braking energy during the entire braking event by ramping more quickly when changing ratios or changing from fully regenerative braking to fully friction braking or vice versa. Ramping more quickly from friction braking to regenerative braking increases the ratio of regenerative to friction braking energy over the braking period, and ramping more quickly from regenerative braking to friction braking increases the ratio of total regenerative energy to friction braking energy over the braking event by allowing the ramping period to begin later.

For a third example, the operating parameter may be a transmission schedule, and the power system may be the transmission 46. The controller 32 may store a different transmission schedule for each possible occupancy status. The transmission schedule has a narrower hysteresis between upshifting to and downshifting from a given gear for occupancy statuses with less stringent NVH requirements. For example, as shown in FIG. 2, a transmission schedule 206 for the unoccupied status (in dot-dashed lines) has narrower hysteresis between upshifting to each forward gear and downshifting from each respective forward gear than a transmission schedule 204 for the back-seat-only-occupied status (in dashed lines), and the transmission schedule 204 for the back-seat-only-occupied status has narrower hysteresis between upshifting to each forward gear and downshifting from each respective forward gear than the transmission schedule 202 for the driver-seat-occupied status (in solid lines). Alternatively or additionally, the transmission schedule includes additional shifts that may occur at steady pedal, that is, when the requested acceleration has not changed, based on the state of charge of the battery pack 56 for occupancy statuses with less stringent NVH requirements. For example, a transmission schedule for the unoccupied status has additional shifts at steady pedal based on the state of charge than a transmission schedule for the back-seat-only-occupied status, and the transmission schedule for the back-seat-only-occupied status has additional shifts at steady pedal based on the state of charge than a transmission schedule for the driver-seat-occupied status. The transmission schedules for adjusted steady-pedal shifting may be stored as additional transmission schedules or as transmission schedule adders applied to base transmission schedules. The transmission schedules for adjusted steady-pedal shifting may be a function of the state of charge, a discharge limit of the battery pack 56, a charge limit of the battery pack 56, the occupancy status, a detected steadiness of the pedal position, and/or other parameters of the hybrid-electric vehicle 30.

Next, in a block 425, the controller 32 controls the power system, specifically, one of the internal-combustion engine 44, the electric motor 54, the transmission 46, the hybrid-electric powertrain 42, and the regenerative-braking system 48, to operate according to the operating parameter as described above, that is, the EPUD schedule, the regenerative-braking schedule, or the transmission schedule. The controller 32 may start or stop the internal-combustion engine 44 according to the EPUD schedule for the current occupancy status. The controller 32 may apply the regenerative-braking system 48 with a ratio of regenerative to friction braking according to the regenerative-braking schedule for the current occupancy status. The controller 32 may shift the transmission 46 according to the transmission schedule for the current occupancy status. The process 400 ends following the block 425.

To execute the exemplary process 400, the controller 32 is programmed to receive occupancy data from the sensors 40, determine an occupancy status based on the occupancy data, set an operating parameter for the power system based on the occupancy status, and control the power system in accordance with the parameter. The controller 32 may be further programmed to determine the occupancy status as occupied if the occupancy data indicates that at least one of the seats 34, 36, 38 are occupied and as unoccupied if the occupancy data indicates that the seats 34, 36, 38 are unoccupied. Alternatively or additionally, the controller 32 may be programmed to determine the occupancy status as driver-seat-occupied if the occupancy data indicates that the driver seat 34 is occupied, as passenger-seat-only-occupied if the occupancy data indicates that the passenger seat 36 is occupied, as back-seat-only-occupied if the occupancy data indicates that the driver and passenger seats 34, 36 are unoccupied and the back seat 38 is occupied, and as unoccupied if the occupancy data indicates that the seats 34, 36, 38 are unoccupied. Yet further alternatively or additionally, the controller 32 may be programmed to determine the occupancy status as front-seat-occupied if the occupancy data indicates that at least one of the driver and passenger seats 34, 36 is occupied and the driver-identifying data indicates that an occupant of the at least one of the driver and passenger seats 34, 36 is a nonchauffeur, as chauffeur if the occupancy data indicates that the driver seat 34 is occupied and the driver-identifying data indicates that an occupant of the driver seat 34 is a chauffeur, as back-seat-only-occupied if the occupancy data indicates that the front seat is unoccupied and the back seat 38 is occupied, and as unoccupied if the occupancy data indicates that the seats 34, 36, 38 are unoccupied.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller, for a hybrid-electric vehicle, the controller comprising a processor and a memory and programmed to:
   determine an occupancy status of the vehicle based on received sensor data;
   set an operating parameter for a power system of the hybrid-electric vehicle based on the occupancy status; and
   control the power system to operate in accordance with the parameter.

2. The controller of claim 1, wherein the occupancy status is one of at least a driver-seat-occupied status, a back-seat-only-occupied status, and an unoccupied status.

3. The controller of claim 2, wherein the operating parameter is an engine-pull-up-down schedule and the power system is a hybrid-electric powertrain.

4. The controller of claim 3, wherein an engine-pull-up-down schedule for the unoccupied status has less hysteresis between starting and stopping an internal-combustion engine than an engine-pull-up-down schedule for the back-seat-only-occupied status, and the engine-pull-up-down schedule for the back-seat-only-occupied status has less hysteresis between starting and stopping an internal-combustion engine than an engine-pull-up-down schedule for the driver-seat-occupied status.

5. The controller of claim 2, wherein the operating parameter is a regenerative-braking schedule and the power system is a regenerative-braking system including regenerative brakes and friction brakes.

6. The controller of claim 5, wherein a regenerative-braking schedule for the unoccupied status has a ratio of regenerative braking to friction braking that is no less than, and under at least some vehicle conditions greater than, a regenerative-braking schedule for the back-seat-only-occupied status; and the regenerative-braking schedule for the back-seat-only-occupied status has a ratio of regenerative braking to friction braking that is no less than, and under at least some vehicle conditions greater than, a regenerative-braking schedule for the driver-seat-occupied status.

7. The controller of claim 2, wherein the operating parameter is a transmission schedule and the power system is a transmission, and a transmission schedule for the unoccupied status has narrower hysteresis between upshifting to each forward gear and downshifting from each respective forward gear than a transmission schedule for the back-seat-only-occupied status, and the transmission schedule for the back-seat-only-occupied status has narrower hysteresis between upshifting to each forward gear and downshifting from each respective forward gear than a transmission schedule for the driver-seat-occupied status.

8. The controller of claim 2, wherein the operating parameter is a transmission schedule and the power system is a hybrid-electric powertrain including a transmission and having a state of charge, and a transmission schedule for the unoccupied status has additional shifts at steady pedal based on the state of charge than a transmission schedule for the back-seat-only-occupied status, and the transmission schedule for the back-seat-only-occupied status has additional shifts at steady pedal based on the state of charge than a transmission schedule for the driver-seat-occupied status.

9. A method of controlling a hybrid-electric vehicle comprising:
detecting an occupancy status of the vehicle;
setting an operating parameter for a power system of the hybrid-electric vehicle based on the occupancy status; and
controlling the power system to operate in accordance with the parameter.

10. The method of claim 9, wherein the occupancy status is one of at least a driver-seat-occupied status, a back-seat-only-occupied status, and an unoccupied status.

11. The method of claim 10, wherein the operating parameter is an engine-pull-up-down schedule and the power system is a hybrid-electric powertrain.

12. The method of claim 11, wherein an engine-pull-up-down schedule for the unoccupied status has less hysteresis between starting and stopping an internal-combustion engine than an engine-pull-up-down schedule for the back-seat-only-occupied status, and the engine-pull-up-down schedule for the back-seat-only-occupied status has less hysteresis between starting and stopping an internal-combustion engine than an engine-pull-up-down schedule for the driver-seat-occupied status.

13. The method of claim 10, wherein the operating parameter is a regenerative-braking schedule and the power system is a regenerative-braking system including regenerative brakes and friction brakes.

14. The method of claim 13, wherein a regenerative-braking schedule for the unoccupied status has a ratio of regenerative braking to friction braking that is no less than, and under at least some vehicle conditions greater than, a regenerative-braking schedule for the back-seat-only-occupied status; and the regenerative-braking schedule for the back-seat-only-occupied status has a ratio of regenerative braking to friction braking that is no less than, and under at least some vehicle conditions greater than, a regenerative-braking schedule for the driver-seat-occupied status.

15. The method of claim 10, wherein the operating parameter is a transmission schedule and the power system is a transmission, and a transmission schedule for the unoccupied status has narrower hysteresis between upshifting to each forward gear and downshifting from each respective forward gear than a transmission schedule for the back-seat-only-occupied status, and the transmission schedule for the back-seat-only-occupied status has narrower hysteresis between upshifting to each forward gear and downshifting from each respective forward gear than a transmission schedule for the driver-seat-occupied status.

16. The method of claim 10, wherein the operating parameter is a transmission schedule and the power system is a hybrid-electric powertrain including a transmission and having a state of charge, and a transmission schedule for the unoccupied status has additional shifts at steady pedal based on the state of charge than a transmission schedule for the back-seat-only-occupied status, and the transmission schedule for the back-seat-only-occupied status has additional shifts at steady pedal based on the state of charge than a transmission schedule for the driver-seat-occupied status.

17. A hybrid-electric vehicle comprising:
a power system;
a controller communicatively coupled to the power system;
a driver seat, a passenger seat, and a back seat coupled to the power system; and
sensors configured to detect occupancy of the driver, passenger, and back seats and in communication with the controller; wherein
the controller is programmed to receive occupancy data from the sensors, determine an occupancy status based on the occupancy data, set an operating parameter for the power system based on the occupancy status, and control the power system in accordance with the parameter.

18. The vehicle of claim 17, wherein the controller is further programmed to determine the occupancy status as a driver-seat-occupied status if the occupancy data indicates that the driver seat is occupied, as a back-seat-only-occupied status if the occupancy data indicates that the driver and passenger seats are unoccupied and the back seat is occupied, and as an unoccupied status if the occupancy data indicates that the seats are unoccupied.

19. The vehicle of claim 18, wherein the operating parameter is an engine-pull-up-down schedule and the power system is a hybrid-electric powertrain, and an engine-pull-up-down schedule for the unoccupied status has less hysteresis between starting and stopping an internal-combustion engine than an engine-pull-up-down schedule for the back-seat-only-occupied status, and the engine-pull-up-down schedule for the back-seat-only-occupied status has less hysteresis between starting and stopping an internal-combustion engine than an engine-pull-up-down schedule for the driver-seat-occupied status.

20. The vehicle of claim 18, wherein the operating parameter is a regenerative-braking schedule and the power system is a regenerative-braking system including regenerative brakes and friction brakes, and a regenerative-braking schedule for the unoccupied status has a ratio of regenerative braking to friction braking that is no less than, and under at least some vehicle conditions greater than, a regenerative-braking schedule for the back-seat-only-occupied status; and the regenerative-braking schedule for the back-seat-only-occupied status has a ratio of regenerative braking to friction braking that is no less than, and under at least some vehicle conditions greater than, a regenerative-braking schedule for the driver-seat-occupied status.

* * * * *